United States Patent [19]

Tanaka et al.

[11] Patent Number: 4,529,974
[45] Date of Patent: Jul. 16, 1985

[54] FLUID LEAKAGE DETECTING APPARATUS

[75] Inventors: Yoshito Tanaka; Ken Ichiryu, both of Ibaraki, Japan

[73] Assignee: Hitachi, Ltd., Tokyo, Japan

[21] Appl. No.: 396,378

[22] Filed: Jul. 8, 1982

[30] Foreign Application Priority Data

Jul. 10, 1981 [JP] Japan .................. 56-106988

[51] Int. Cl.³ .................................. G08B 21/00
[52] U.S. Cl. .......................... 340/605; 73/204
[58] Field of Search ............... 340/605; 73/40.5 R, 73/204

[56] References Cited

U.S. PATENT DOCUMENTS

| | | | |
|---|---|---|---|
| 2,499,806 | 3/1950 | Wolsk et al. | 73/40.5 R |
| 3,132,506 | 5/1964 | Pritchett | 73/40.5 R |
| 3,786,675 | 1/1974 | Delatorre et al. | 340/605 |
| 3,874,222 | 4/1975 | Ladd et al. | 340/605 |
| 3,967,256 | 6/1976 | Galatis | 340/605 |
| 4,373,387 | 2/1983 | Nishimura et al. | 73/204 |

Primary Examiner—Jerry W. Myracle
Attorney, Agent, or Firm—Antonelli, Terry & Wands

[57] ABSTRACT

An apparatus for detecting leakage of fluid comprises a bridge circuit composed of a heat generating resistance element connected in one arm and installed at a location where leakage of fluid may possibly occur and other resistor elements inserted in other arms, respectively, an input power supply source connected to the input of the bridge circuit and a differential amplifier connected to the output of the bridge circuit for amplifying an unbalance voltage produced by the bridge circuit, wherein the resistor elements inserted in the other arms of the bridge circuit are so dimensioned that the heat generating resistance element is maintained in a heat generating state.

6 Claims, 7 Drawing Figures

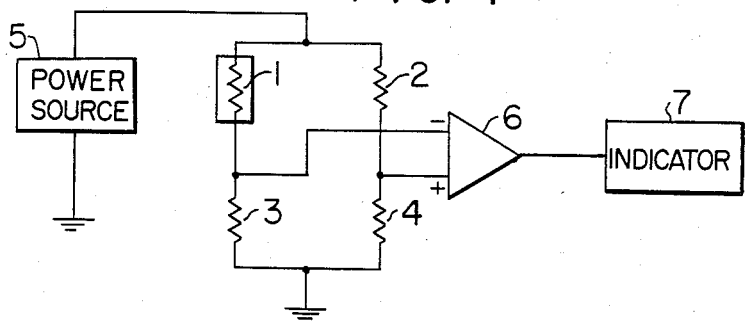
FIG. 1
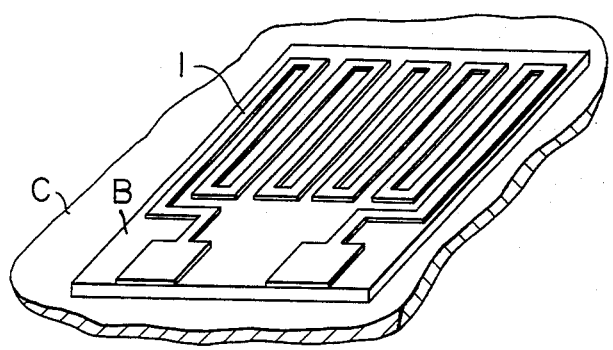
FIG. 2
FIG. 3
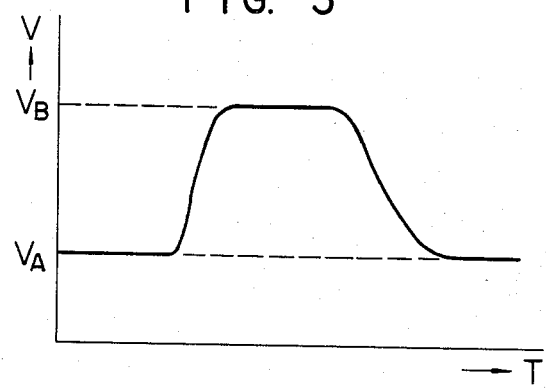
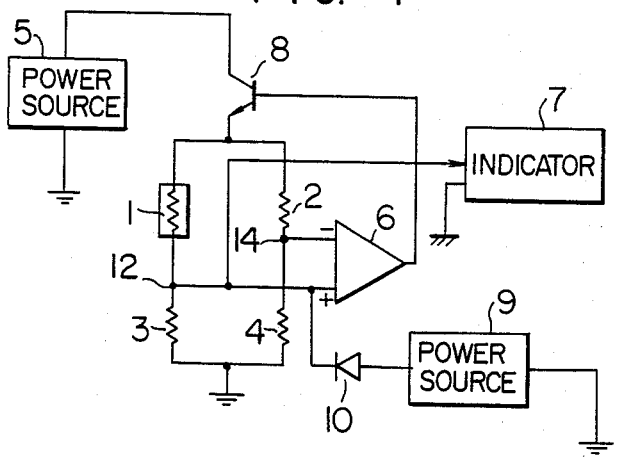
FIG. 4
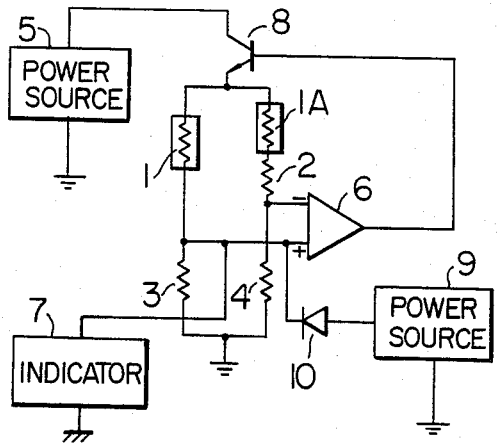
FIG. 5
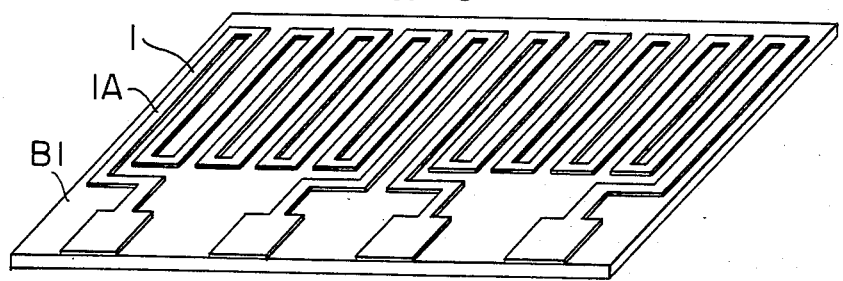
FIG. 6
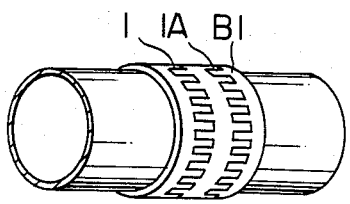
FIG. 7

FLUID LEAKAGE DETECTING APPARATUS

BACKGROUND OF THE INVENTION

The present invention relates in general to an apparatus for detecting leakage of fluids to the exterior from piping systems and instruments provided in the piping system. More particularly, the present invention relates to a fluid leakage detecting apparatus which is suited for detecting leakage of fluids over a very wide range in quantity of leakage from a very small quantity such as oozing to a large quantity in machines and instruments of power plants, pressure containers, petroleum pipe lines, petroleum tanks and hydraulic pumps, motors and various valves controlled by various fluids.

In plant equipment such as nuclear power plants, thermal power plants and others, piping systems for conveying fluids required for operations of the various equipment are densely laid on together with various machines and instruments attached thereto. In the long run of use or under external influences such as earthquakes, there will eventually be produced cracks, splits and interstices in the piping system and the accessories such as the valves and others and/or at various connections, resulting in that the fluids leak out through these cracks or interstices to endanger the safety in operation of the plant equipments. To deal with such problem, various detecting apparatus for detecting the leakage of fluid are proposed to be installed at locations where fluid leakage may be expected to occur. There are known many kinds of the fluid leakage detecting apparatus, e.g. sonic type, reflection type and electrical resistance type leakage detectors. However, those known detecting apparatus are generally complicated in structure due to their operation principles or configurations of their detector heads. Further, applications of these apparatus are generally limited to specific atmospheric or environmental conditions to which they are exposed. Thus, the known leakage detecting apparatus are not only expensive and voluminous but also lacking in the versatility.

In particular, the detecting apparatus of the above-mentioned types suffer from a limitation in the capability of detecting the fluid leakage depending on amount or quantity of the leakage. For example, it is difficult for the hitherto known detectors to detect with a reasonable reliability a very small leakage such as oozing. Further, since the prior art apparatus can detect the fluid leakage only when the fluid leakage has accumulated to a certain amount, it is impossible to detect the leakage immediately when the leakage occurs.

For example, in the case of the fluid leakage detecting apparatus of the sonic type in which when a fluid confined within a container leaks out through a fine opening such as a crack or split formed in the container, the sonic energy produced at the fluid leakage portion of the container is detected by a sonic sensor mounted to the container. Detection of the fluid leakage is often rendered very difficult, if not impossible, due to the background noise prevailing in the neighborhood. The fluid leakage detecting apparatus which is based on measurement of the reflection factor of the fluid in concern requires necessarily the use of optical means. Accordingly, high precision is required for the installation of this type detecting apparatus. Additionally, the apparatus is very expensive. For these reasons, the fluid leakage detecting apparatus of the reflection type is not suited, in most cases, for detecting fluid leakages in industrial machines. The detecting apparatus of the electrical resistance type is based on the principle that variation in resistance value of an electric resistance element brought about by contact with a leakage fluid to be monitored is detected. Examples of such electric resistance type fluid leakage detecting apparatus are disclosed in Japanese Patent Applications Laid-open Nos. 151250/80 and 113928/80. In the case of this type detecting apparatus, much consideration must be paid to the resistivity of the resistance element against chemical reaction as well as mechanical vibrations. Further, contact of a leakage fluid with the resistance element will not necessarily bring about immediate variation in the resistance value thereof to any substantial degree, when the fluid leakage is very small. In other words, the fluid leakage detecting apparatus of the resistance type is generally not satisfactory in respect of the response speed and the detecting sensitivity and thus is unsuited for the detection of minute fluid leakage.

SUMMARY OF THE INVENTION

An object of the present invention is to provide a fluid leakage detecting apparatus which is capable of detecting even a small fluid leakage such as oozing out.

Another object of the invention is to provide a fluid leakage detecting apparatus which can detect immediately fluid leakage even of a very small amount.

A further object of the invention is to provide a fluid leakage detecting apparatus which is suited for detecting or sensing fluids leakage through cracks, apertures or interstices formed in containers such as pressurizing containers and petroleum containers and others, piping systems such as pipe lines or the like, various rotary machines such as pumps and motors controlled by various fluids and various control valve units.

To achieve the above objects, there is proposed according to the present invention a fluid leakage detecting apparatus which comprises a bridge circuit composed of a heat generating resistance element connected in one arm and installed at a location where leakage of fluid may possibly occur and other resistor elements inserted in other arms, respectively, an input power supply source connected to the input of the bridge circuit and a differential amplifier connected to the output of the bridge circuit for amplifying an unbalance voltage produced by the bridge circuit, wherein the resistor elements inserted in the other arms of the bridge circuit, respectively, are so dimensioned that the heat generating resistance element is normally maintained in a heat generating state.

The above and other objects, features and advantages of the invention will be more apparent from description of preferred embodiments thereof taken in conjunction with the accompanying drawings.

BRIEF DESCRIPTION OF THE DRAWINGS

FIG. 1 is an electrical circuit diagram of a fluid leakage detecting apparatus according to the invention;

FIG. 2 is a perspective view showing a heat generating resistance element used in the leakage detecting apparatus shown in FIG. 1;

FIG. 3 shows a characteristic curve for illustrating variation in the output voltage of the detecting apparatus shown in FIG. 1 with progress of fluid leakage;

FIG. 4 is a circuit diagram of the fluid leakage detecting apparatus according to another embodiment of the invention;

FIG. 5 is a circuit diagram of the fluid leakage detecting apparatus according to still another embodiment of the invention;

FIG. 6 is a perspective view showing a heat generating resistance element and a temperature compensating resistor used in the fluid leakage detecting apparatus shown in FIG. 5; and FIG. 7 is a perspective view of a fluid leakage detecting apparatus according to the invention in the state installed on a pipe.

DESCRIPTION OF THE PREFERRED EMBODIMENTS

Referring to FIG. 1 which shows an electric circuit diagram of an apparatus for detecting leakage of a fluid (herein referred to as the fluid leakage detecting apparatus) according to an exemplary embodiment of the invention, a heat generating resistance element 1 is disposed at a location where leakage of fluid in concern possibly occurs, and electrically connected in an arm of a bridge circuit which has resistors 2, 3 and 4 connected, respectively, in other arms thereof. The resistor 3 is realized in the form of a variable resistor of which resistance is adjusted so that the bridge circuit is normally in a balanced state to produce no output voltage. A junction between the heat generating resistance element 1 and the resistor 2 of the bridge circuit and its diagonal junction are connected to a DC power supply source 5 which applies a DC input voltage to the bridge circuit. When the bridge circuit is rendered unbalanced, an unbalance output voltage is produced across the junction between the heat generating resistance element 1 and the resistor 3 and the junction between the resistors 2 and 4. The output voltage is amplified by a differential amplifier 6 and supplied to an indicator 7 for indication.

The heat generating resistance element is preferably made of a platinum wire bonded to a substrate B of a refractory material, as is illustrated in FIG. 2. The refractory substrate B provided with the heat generating resistance element 1 is mounted at a location C of a fluid flow system at which there exists a possibility of the fluid being leaked.

Again referring to the electric circuit diagram shown in FIG. 1, assume that the resistance value of the heat generating resistance element 1 is represented by $R_w$, while the resistance values of the resistors 2, 3 and 4 are represented by $R_2$, $R_3$ and $R_4$, respectively. The resistance values $R_w$ and $R_3$ are selected to be relatively low value, for example, several ten ohms so that the heat generating resistance element 1 is heated to a high temperature, for example, up to 100° C. or more, while the resistance values $R_2$ and $R_4$ are relatively high, for example, several hundred ohms. The heating temperature of the resistance element 1 is changed, however, by adjusting the resistance value $R_3$ of the variable resistor 3 in order to have the unbalance output voltage of the bridge circuit balanced. In any event, the heating temperature $T_w$ of the resistance element 1 is much higher than the environment temperature $T_a$. Further, the higher temperature of the resistance element 1 may give an effect to burn out the dusts or the like attached thereto.

The heat generating resistance element 1 changes its resistance value with variation of the heated temperature of the element 1 and is normally heated to a temperature $T_w$ at which the heat quantity produced by the resistance element 1 is balanced with the heat quantity dissipated therefrom to the ambient temperature $T_a$, while the bridge circuit produces its output determined by the resistance value $R_w$ of the resistance element 1 at the temperature $T_w$, assuming that the resistance values of the resistors $R_2$, $R_3$ and $R_4$ are held substantially constant. When a leakage of fluid occurs, the heat quantity dissipated from the element 1 changes with variation of heat dissipating condition such as heat conductivity of the unit including the resistance element 1 and the substrate B due to the unit wet by the leaked fluid. Thus, the heating temperature $T_w$ of the resistance element 1 changes, which in turn changes the resistance value $R_w$ of the element 1 so that the bridge circuit is rendered unbalanced thereby producing an output voltage, which is supplied through the amplifier 6 to the indicator 7 to indicate leakage of the fluid.

Describing in more detail the relationship between the quantity of heat generation and the quantity of heat dissipation of the heat generating resistance element 1, it can be mentioned that the quantity of heat dissipated from the heat generating resistance element 1 to the environment in which the element 1 is disposed is not only proportional to the difference between the heated temperature $T_w$ of the element 1 and the environmental or ambient temperature $T_a$ but also influenced by factors such as the thermal conductivity, viscosity, specific heat and amount of the leaked fluid, configuration of the heat generating resistance element. Accordingly, when the voltage appearing across the heat generating resistance element 1 is represented by $V_w$ with the current flowing through the element 1 being represented by $I_w$, the relationship between the heat generation and the heat dissipation of the heat generating resistance element 1 can be given by the following expression (1):

$$I_w^2 \cdot R_w = V_w^2 / R_w = A(T_w - T_a) \tag{1}$$

where A represents a constant determined by the above-mentioned various factors.

Next, operation of the fluid leakage detecting apparatus shown in FIG. 1 will be described below.

When a leaked fluid contacts or adheres to the unit including the heat generating resistance element 1, the heating temperature $T_w$ of the element 1 changes, resulting in variation of the resistance value $R_w$ of the heat generating resistance element 1 in accordance with the aforementioned expression (1), whereby the bridge circuit is rendered unbalance thereby producing an output voltage. This output voltage is supplied through the differential amplifier 6 to the indicator 7 as the signal representative of the fluid leakage.

FIG. 3 graphically illustrates variation in the output voltage of the bridge circuit upon detection of the fluid leakage. In FIG. 3, time is taken along the abscissa, while the output voltage V of the bridge circuit is taken along the ordinate. The level $V_A$ represents the output voltage V produced upon deposition of an environmental fluid a such as water on the heat generating resistance element 1. Starting from this state, when a leaked fluid b having a thermal conductivity different from that of the fluid a contacts or adheres to the heat generating resistance element 1, the output voltage V is varied to the voltage level $V_B$. When the fluid b is removed and the fluid a again contacts or adheres to the heat generating resistance element 1, the output voltage of the bridge circuit regains the voltage level $V_A$. In this way, the leakage of a fluid b in concern can be instantaneously detected on the basis of the variation in level of the output voltage of the bridge circuit as brought about by changes in the thermal conductivity of the heat generating resistance element.

FIG. 4 shows an electric circuit diagram of another embodiment of the fluid leakage detecting apparatus according to the present invention. In this figure, the like elements as those shown in FIG. 1 are denoted by the same reference numerals. In the case of the fluid leakage detecting apparatus shown in FIG. 4, the bridge circuit is adjusted to be normally balanced so that no output voltage is produced across the junction 12 of the resistors 1 and 3 and the junction 14 of the resistors 2 and 4 if an auxiliary power supply source 9 is disconnected. However, the auxiliary power supply source 9 is provided to produce a DC output voltage which is slightly higher than the potential which is generated at the junction 12 when the bridge circuit is balanced and supplied with a normal exciting current. Therefore, when the power source 9 is connected, the bridge circuit produces a small output voltage, which is amplified by a differential amplifier 6 and applied to the base of a transistor 8, which in turn controls the exciting current supplied from the power source 5 to the bridge circuit according to the base voltage supplied from the amplifier 6. The gain of the amplifier 6 is selected such that the normal exciting current is supplied from the power source through the transistor 8 to the bridge circuit when the bridge circuit is correctly adjusted and no fluid leakage occurs at the element 1. When a fluid leakage occurs, the resistance of the element 1 is decreased, causing the potential at the junction 12 to increase higher than the output of the auxiliary power source 9, and causing the transistor current, i.e. the exciting current of the bridge circuit to increase, resulting in further increasing the potential at the junction 12. Thus, when a fluid leakage occurs, the potential at the junction 12 is rapidly increased to a certain level until the transistor 8 is saturated. The potential at the junction 12 or the voltage across the resistor 3 is supplied to the indicator 7 for indicating the fluid leakage. With increase of the exciting current, the resistor element 1 is heated to a higher temperature, causing the potential at the junction 12 to decrease, causing the transistor current or the exciting current of the bridge circuit to decrease, resulting in further decreasing of the potential at the junction 12. If the fluid leakage continues, the potential at the junction 12 will again increase to the saturation level.

In the fluid leakage detecting apparatus described in the foregoing, it has been assumed that the ambient temperature $T_a$ scarcely undergoes variation. However, in practice, there are applications where the ambient or atmospheric temperature $T_a$ varies resulting in variation of the output voltage of the bridge circuit due to change of the resistance value of the element 1. In the light of such situation, it is advantageous to insert a temperature compensating resistor 1A in series to the resistor 2 of the bridge circuit, as shown in FIG. 5 to thereby assure that the temperature $T_w$ of the heat generating resistance element does not vary with variation in the ambient temperature $T_a$. The temperature compensating resistor 1A has substantially the same temperature-to-resistance characteristic as that of the resistance element 1. The temperature compensating resistor 1A may be connected in a similar manner in the bridge circuit of the fluid leakage detecting apparatus shown in FIG. 1. In the case of the fluid leakage detecting apparatus arranged so as to compensate for variation in the ambient temperture $T_a$, the temperature compensating resistance element 1A can be mounted on the substrate B1 together with the heat generating resistance element 1, as shown in FIG. 6. The substrate B1 is of course installed at a location where there exists the possibility of fluid leakage.

In the above-mentioned embodiments, the heat generating element 1 and temperature compensating resistor element 1A are illustrated as bonded to the plate-like substrate (B or B1). However, it is equally possible to form the insulation substrate B1 in a configuration comforming to a given shape of the pipe and the like on which the fluid leakage detecting apparatus is to be mounted, as shown in FIG. 7, and bond the heat generating resistance element 1 and the temperature compensating element 1A on the substrate thus formed. With the fluid leakage detecting apparatus of this arrangement, fluid leakage from a member of any given shape can be detected. Further, the heat generating resistance element 1 and/or the temperature compensating resistor 1A may be realized in a coil-like form.

The fluid leakage detecting apparatus disclosed herein are capable of detecting even the smallest leakage without fail and thus can be advantageously employed for detecting external leakage of fluids from pipe lines, petroleum tanks, hydraulic components such as pumps, motors, valves, conduits as well as leakage of vapor in nuclear power plants and thermal power plants, whereby appropriate measures can be taken in advance for preventing the occurrence of the failures due to such leakages. Further, the fluid leakage detecting apparatus according to the invention is less susceptible to the influences exerted by the ambient temperatures and different kinds of fluids as compared with the hitherto known resistor type fluid leakage detectors described hereinbefore. Besides, the fluid leakage detecting apparatus according to the invention does not require any complicated structure and troublesome adjustment as is in the case of the hitherto known optical detector but can be realized in a simplified and thin structure of a small size suited to be mounted at every location or place, as is usually the case in strain gauges.

As will be appreciated from the foregoing, the fluid leakage detecting apparatus according to the invention can immediately and reliably detect fluid leakages in a wide range of small to large quantities and thus allows appropriate measures to be taken in advance against serious failures which would otherwise occur in associated fluid handling systems and instruments, whereby safety of these systems and instruments can be assured.

We claim:

1. An apparatus for detecting leakage of a fluid, comprising:

a bridge circuit composed of a heat generating resistance element connected in one arm of said bridge circuit and installed at a location where leakage of fluid may possibly occur and other resistor elements inserted in other arms of said bridge circuit, respectively;

an input power supply source connected to the input of said bridge circuit for supplying an exciting current to said bridge circuit so that said heat generating resistance element is sufficiently heated when no leakage of the fluid occurs;

means connected to said bridge circuit for causing said bridge circuit to produce an unbalance output voltage when no leakage of the fluid occurs:

a differential amplifier connected to the output of said bridge circuit for amplifying the output voltage produced by said bridge circuit;

means connected between said input power supply source and said bridge circuit and responsive to the output of said differential amplifier to control the amount of said exciting current so that said heat generating resistance element is sufficiently heated by said exciting current when no leakage of the fluid occurs and variation of the output of said differential amplifier causes the amount of said exciting current to vary correspondingly; and means responsive to variation of the amount of said exciting current for indicating whether leakage of the fluid occurs or not.

2. A fluid leakage detecting apparatus according to claim 1, wherein one of the other arms of said bridge circuit has a temperature compensating resistor inserted therein which is exposed to the atmosphere of fluid to be measured together with said heat generating resistance element.

3. A fluid leakage detecting apparatus according to claim 2, wherein both of said heat generating resistance element and said temperature compensating element are made of platinum.

4. A fluid leakage detecting apparatus according to claim 2, wherein both of said heat generating resistance element and said temperature compensating element are provided on a substrate of a refractory material.

5. A fluid leakage detecting apparatus according to claim 1, wherein said heat generating resistance is made of platinum.

6. A fluid leakage detecting apparatus acording to claim 5, wherein said heat generating resistance element is provided on a substrate of a refractory material.

* * * * *